United States Patent [19]
Madden

[11] 3,979,093
[45] Sept. 7, 1976

[54] MEANS FOR MOUNTING PIPES AND CONDUITS IN STUDS AND JOISTS

[76] Inventor: James E. Madden, 14826 Skyline Blvd., Apt. 4, Woodside, Calif. 94062

[22] Filed: Apr. 7, 1975

[21] Appl. No.: 565,812

Related U.S. Application Data

[63] Continuation-in-part of Ser. No. 407,534, Oct. 18, 1973, Pat. No. 3,918,667.

[52] U.S. Cl. .............................. 248/56; 248/74 PB; 248/205 A; 248/300
[51] Int. Cl.² .......................................... F16L 5/00
[58] Field of Search............ 248/54 R, 56, 57, 74 R, 248/74 PB, 205 A, 300; 24/73 AP, 73 PB; 85/49; 16/2

[56] References Cited
UNITED STATES PATENTS

| | | | |
|---|---|---|---|
| 501,439 | 7/1893 | Reznor | 85/49 |
| 2,110,734 | 3/1938 | Leslie | 85/49 |
| 3,034,185 | 5/1962 | Olsen | 248/56 X |
| 3,266,761 | 8/1966 | Walton et al. | 248/54 R X |
| 3,366,356 | 1/1968 | Fisher | 248/56 |
| 3,481,571 | 12/1969 | Lauckner | 248/57 |
| 3,529,795 | 9/1970 | Van Niel | 248/74 PB X |
| 3,559,933 | 2/1971 | Castellani | 248/205 A X |
| 3,576,304 | 4/1971 | Gillemot et al. | 248/205 A UX |
| 3,637,177 | 1/1972 | Santucci | 248/74 PB |
| 3,684,220 | 8/1972 | Logsdon | 248/56 |
| 3,684,223 | 8/1972 | Logsdon | 248/74 PB |
| 3,847,331 | 11/1974 | Vallinotto et al. | 248/74 PB |

Primary Examiner—James T. McCall
Assistant Examiner—Rodney H. Bonck
Attorney, Agent, or Firm—Julian Caplan

[57] ABSTRACT

A notch slightly larger than the diameter of the pipe or conduit is cut into the edge of a stud or joist and the pipe is installed, fitting into the notch. A reinforcement is provided consisted of a plate and a split plastic sleeve, which may be bonded together or formed integral. The plate is nailed to the face of the studs or joist, bridging the notch and lying at right angles to the pipe. The sleeve is pulled apart to fit around the pipe and connected together by a staple bridging the split or by nailing a protruding ear to the stud. The sleeve is preferably thin-walled and stiffened by radially-inward protruding ribs.

1 Claim, 5 Drawing Figures

MEANS FOR MOUNTING PIPES AND CONDUITS IN STUDS AND JOISTS

This invention is a continuation-in-part of copending application Ser. No. 407,534 filed Oct. 18, 1973 and now U.S. Pat. No. 3,918,667.

This invention relates to a new and improved mounting for pipes and conduits in studs and joists. It will be understood that the invention has application in the installation of water and gas pipes and electrical conduits, all of which are hereinafter referred to as pipes, and that the same may be installed in studs and joints of either wood or metal, all of which are hereinafter referred to as studs.

The principal purpose of the invention is to mount a pipe extending through a stud accurately and securely in place. The mounting of the present invention reduces the labor required and is an improvement over conventional mountings wherein holes are drilled through the stud and the pipe is inserted by snaking it through the series of studs of a wall.

One of the principal advantages of the present invention is the fact that it is not necessary to drill through the stud but merely to cut a notch in the wall edge thereof by means of a saw. Further, the pipe is installed in a series of notches in adjacent studs merely by inserting them into the notches rather than snaking the pipe into the holes from the side.

Another feature of the invention is the provision of a sheet metal reinforcement which is nailed to the stud surrounding the notch cut therein and restrengthens the stud so that the strength of the material cut away is replaced.

Still another feature of the invention is the provision of a plastic sleeve which fits around the pipe and occupies most of the space between the pipe and the reinforcement or the walls of the notch in the stud and reduces vibration and controls grounding.

A further advantage of the invention is the fact that the plastic sleeve and the reinforcement may be formed integral or may be fastened together by means of an adhesive so that the sleeve and reinforcement may be installed together.

Other objects of the present invention will become apparent upon reading the following specification and referring to the accompanying drawings in which similar charactes of reference represent corresponding parts in each of the several views.

Figure 1:
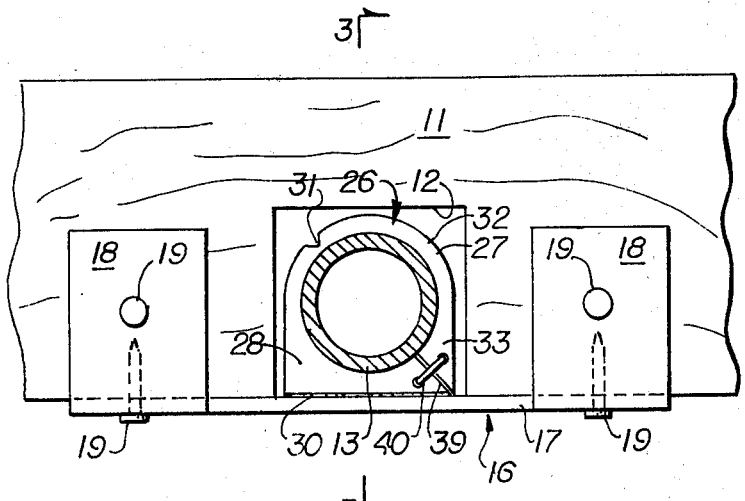
FIG. 1 is a side elevational view of a stud in which the present invention is installed.
Figure 2:
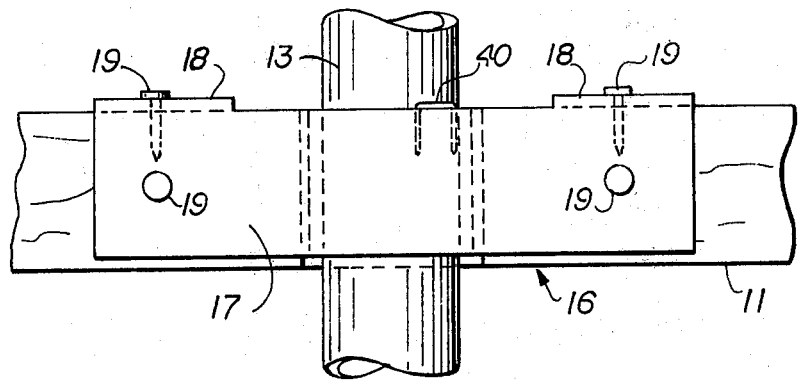
FIG. 2 is an end elevation of the structure of FIG. 1.

The invention is adapted for installation in a stud 11 here shown to be of wood, it being understood that the member may be a joist and may be constructed of wood or metal. A preferably square notch 12 is cut into the wall edge of stud 11 being of a dimension slightly greater than the diameter of the pipe or conduit (hereinafter referred to as "pipe") 13 to be installed. Several notches may be cut into a single stud if required. Since the notch 12 is cut into the room side of the stud 11 and all adjacent studs, the pipe 13 need merely be placed in the notches 12 rather than being snaked into the holes ordinarily drilled into studs in accordance with prior practice.

A reinforcement 16 is provided preferably of sheet metal and having a front flange 17 which is long enough to bridge the notch 12 when it is nailed by means of nails 19 to the room-facing edge of stud 11. Optionally, side flanges 18 may be formed adjacent the ends of front flange 17 overlapping a face of stud 11 and secured thereto by means of nails 19.

Figure 4:
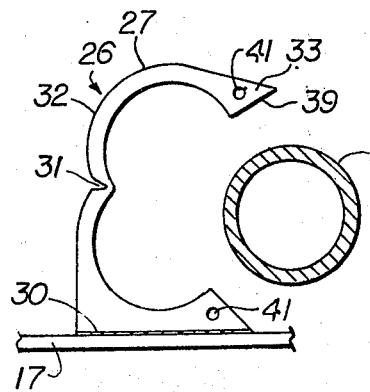
FIG. 4 is a view in end elevation of a portion of the reinforcement with the sleeve open for insertion of the pipe.
Figure 3:
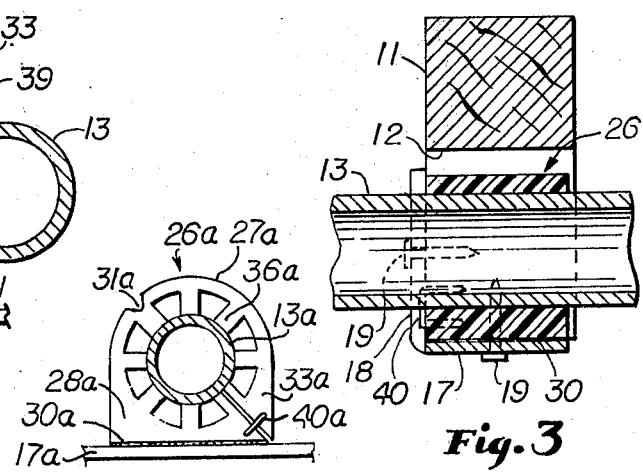
FIG. 3 is a sectional view taken substantially along the lines 3—3 of FIG. 1.

Attached to or formed integral with front flange 17 is a split sleeve 26. In the form of the invention shown in FIG. 1 for large diameter pipes, the sleeves 26 has a cylindrical portion 27 having an inside diameter about equal to that of pipe 13 and a wall thickness sufficient for rigidity of the sleeve 26. The cylindrical portion 27 has a base 28 having a straight base edge 29 which fits against front flange 17 and is secured thereto by means of an adhesive 30 such as an epoxy adhesive. It will be understood that the reinforcement 16 may be made of plastic; and in such event, the sleeve 26 and reinforcement 16 may be made integral. Adjacent one corner, the cylindrical portion 27 is formed with a notch 31 which permits flexure of the sleeve. Opposite notch 31 the sleeve is formed with a split 39 permitting the flexible portion 32 between split 39 and notch 31 and opposite reinforcement 16 to be pulled apart as best shown in FIG. 4 so that it may be inserted over the pipe 13. An enlargement 33 is formed on flexible portion 32 adjacent split 39 and holes 41 are formed in enlargement 33 and in the base edge 29 to receive a staple 40 which fits into the holes 41 and secures the sleeve together once it has been installed over the pipe 13.

Figure 5:
FIG. 5 is a view of a modification for smaller diameter pipes.

For smaller diameter pipes, as best shown in FIG. 5, the cylindrical portion 27a being of a wall thickness only slightly greater than the small diameter pipe 13a. To rigidify the structure, radially inwardly projecting fingers 36a are formed and these fit against the outside wall of the pipe 13a.

In the use of the device, the notch 12 is cut into stud 11 and pipe 13 installed. Thereupon, the flexible portion 32 is separated from base 28 by flexing the plastic at notch 31 and the device is slipped over the pipe 13. The staple 40 is installed in holes 41, bringing the sleeve together around the pipe. Thereupon, the reinforcement is nailed to the edge of the stud 11 by nails 19. The sleeve 26 protects the pipe 13 from any contact with the reinforcement 16 and reduces vibration or electrical grounding.

What is claimed is:

1. A reinforcement for a conventional wall stud formed with a notch in one edge to receive a pipe extending transverse to said stud comprising an elongated metal plate dimensioned to fit along said one edge of said stud to bridge said notch and adapted to be secured to said stud to reinforce said stud in the area where said notch is formed and a flexible sleeve for said pipe, said sleeve having a straight base edge permanently fixed to said plate, a first side substantially perpendicular to said base extending from one end of said base, a top and a second side normally parallel to said first side engaging the opposite end of said base, said sleeve having a bore shaped to engage the outside of said pipe and being dimensioned to fit within said notch, said sleeve being formed with a split at the juncture of said base and said second side to permit said sleeve to be distended to be slipped over a pipe, said split being located out of contact with said plate, whereby said sleeve may be distended without interference from said plate, said sleeve being formed with a weakened portion to facilitate distention of said sleeve, and closure means adjacent said split to hold said sleeve with the edges of said split abutting each other, said closure means comprising enlargement of said sleeve having apertures parallel to said pipe on opposite sides of said split and fastening means fitting into the apertures in both said enlargements.

* * * * *